UNITED STATES PATENT OFFICE.

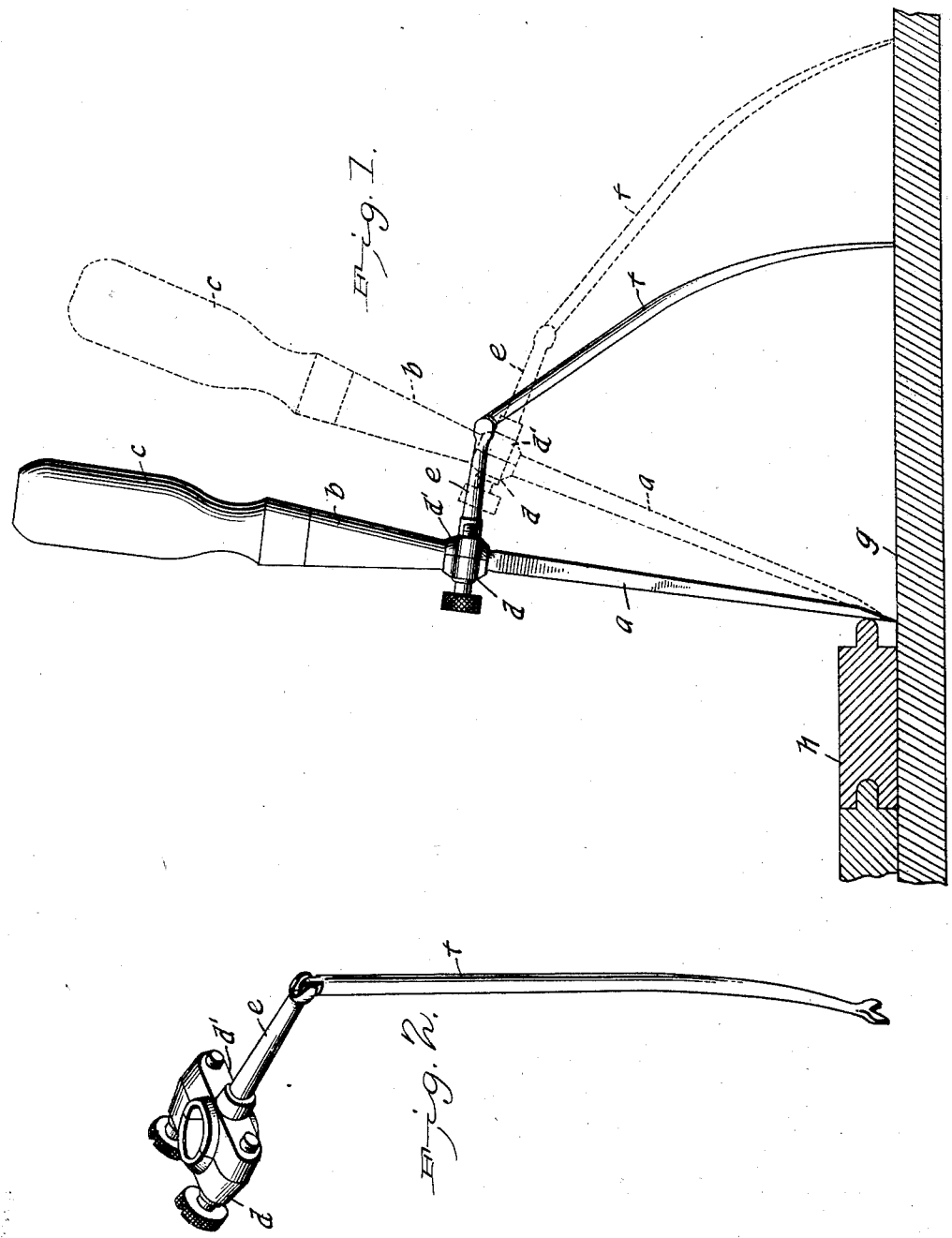

GUSTAVUS W. PARKER, OF BRUNSWICK, MAINE.

CHISEL ATTACHMENT.

SPECIFICATION forming part of Letters Patent No. 719,607, dated February 3, 1903.

Application filed December 1, 1902. Serial No. 133,407. (No model.)

*To all whom it may concern:*

Be it known that I, GUSTAVUS W. PARKER, a citizen of the United States, residing at Brunswick, in the county of Cumberland and State of Maine, have invented a new and useful Chisel Attachment, of which the following is a specification.

This invention has relation to means employed by carpenters for pressing floor-boards being laid tightly together and holding them prior to and while nailing them to their supporting beams or boards.

It is the object of the invention to provide a device that may be simple in its organization and economical of construction and at the same time ready of application to and removable from a common carpenter's chisel and that will when so applied be capable of being most efficiently employed as a floor-clamp.

To these ends the invention consists of the device hereinafter described and claimed, reference being had to the accompanying drawings, and to the letters of reference marked thereon, forming a part of this specification, it being understood that changes may be made in the form and arrangement of parts without departing from the nature or spirit of the invention, I having but attempted to set forth a form that now appears to me best in which the invention may be embodied.

In the accompanying drawings, Figure 1 is an elevation of the chisel and its attachment as applied to its use. Fig. 2 is a perspective view of the attachment as separated from the chisel.

In the drawings, $a$ designates the chisel-blade, and $b$ is the socketed shank in which the handle $c$ is set or to which it may be secured. These parts may be of common or any suitable construction.

$d\ d'$ designate the two parts of a split pinch-collar adapted to be secured to the handle or shank of the chisel, and this is done by providing each of the parts of the pinch-collar on its opposite sides with lugs or projections and passing screws through holes formed in the lugs of the part $d$ and tapping them into screw-threaded holes made in the lugs of the part $d'$, as shown.

Formed or connected with the part $d'$ and projecting outward therefrom is a rigid arm or rod $e$, to the outer end of which the upper end of a dog $f$ is pivoted. The dog $f$ is preferably of slightly-curved form and is constructed at its lower end so that it may readily engage the beams or under flooring upon which the floor or face boards are to be laid.

In Fig. 1, $g$ designates the under flooring or beam, upon which the tongue and grooved or face flooring $h$ is laid.

In use the lower end of the chisel will be engaged with the lower flooring or beam under the forward edge of the face floor-board $h$ being acted upon to be laid, or it may be under a bearing-block interposed between said edge and the chisel, the handle being back and the chisel slanting from the handle downward toward the operator, when the latter by pulling upon the handle in a direction toward himself will force the floor-board $h$ home, closely connecting its grooved edge with the tongued edge of the last previously-laid board, when the free end of the dog will be engaged with or catch into the lower flooring and the face-board $h$ held in the position to which it was forced, as before said, while it is being nailed fast.

My improved attachment forms a most convenient and efficient device for the purpose named and obviates the necessity of providing or purchasing a complete tool for the purpose, which latter is not only relatively expensive, but so far as is known to me is not so ready nor of so great range of use as is my invention.

I have found by experience that I can efficiently employ my improvements in limited spaces and other places where the ordinary floor-clamp cannot be used or used to the same advantage as mine.

A chisel is generally at every carpenter's hands and forms a completely serviceable device to which my attachment may be secured and with which it may coöperate to effect the functions specified.

What I claim as new and as of my invention is—

1. An attachment for chisels consisting of a collar for securing the attachment to the chisel, a rod extending outward from the said collar, and a dog pivoted to the outer end of the said rod.

2. An attachment for chisels consisting of a split pinch-collar adapted to be fitted upon a chisel, set-screws connected with the said collar for clamping it in place, a rod formed with and projecting outward from one of the parts of the collar, and a dog pivoted at one end to the free end of the said rod, and having its other end constructed to engage the flooring or beam upon which the boards being acted upon are laid.

3. An attachment for chisels consisting of a split pinch-collar, each part thereof having a swelled lug or projection on each of its sides, set-screws in said lugs for clamping the collar in place on the chisel, a rod formed with and projecting outward from one of the parts of the collar, and a curved dog pivoted at one end to the free end of the said rod, and constructed at its other end to engage the flooring or beam upon which the boards being acted upon are laid.

In testimony that I claim the foregoing as my own I have hereto affixed my signature in the presence of two witnesses.

GUSTAVUS W. PARKER.

Witnesses:
EDWARD W. WHEELER,
WESTON MONQUIRE.